United States Patent
Tsuji et al.

(10) Patent No.: US 10,244,148 B2
(45) Date of Patent: Mar. 26, 2019

(54) PRINTER, COLOR CONVERSION CONTROL PROGRAM AND COLOR CONVERSION CONTROL METHOD

(71) Applicant: KONICA MINOLTA, INC., Chiyoda-ku, Tokyo (JP)

(72) Inventors: Kosuke Tsuji, Hachioji (JP); Sachiko Hirano, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/589,147

(22) Filed: May 8, 2017

(65) Prior Publication Data

US 2017/0353630 A1  Dec. 7, 2017

(30) Foreign Application Priority Data

Jun. 3, 2016 (JP) ................................ 2016-111715

(51) Int. Cl.
*G01J 3/46* (2006.01)
*H04N 1/60* (2006.01)

(52) U.S. Cl.
CPC ............ *H04N 1/6044* (2013.01); *G01J 3/46* (2013.01); *H04N 1/6008* (2013.01); *H04N 1/6058* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,296,923 A | * | 3/1994 | Hung | H04N 1/6033 358/406 |
| 5,581,376 A | * | 12/1996 | Harrington | H04N 1/6019 345/600 |
| 5,592,591 A | * | 1/1997 | Rolleston | H04N 1/60 358/1.5 |

(Continued)

FOREIGN PATENT DOCUMENTS

| | | |
|---|---|---|
| CN | 102137273 | 7/2011 |
| JP | 11-055536 A | 2/1999 |

OTHER PUBLICATIONS

First Office Action issued in corresponding Chinese Patent Application No. 201710408620.2, dated Nov. 21, 2018, with Engiish Translation (23 pages).

*Primary Examiner* — Anh-Vinh T Nguyen
(74) *Attorney, Agent, or Firm* — Buchanan Ingersoll & Rooney PC

(57) ABSTRACT

A printer includes: an inline scanner which acquires an RGB value of each patch of a color chart; an inline colorimeter which acquires a colorimetric value of each patch of the color chart; a profile creation unit which creates a profile for associating the RGB value with the colorimetric value of each patch; and a color conversion unit which estimates a colorimetric value corresponding to an RGB value of input data by extrapolation calculation using four points including three points forming a plane and one supporting point in data of the profile, wherein the color conversion unit estimates the colorimetric value corresponding to the RGB value based on a set of four points remained after deleting one or a plurality of sets of four points according to a predetermined rule from a plurality of sets of four points selected for an RGB value input.

22 Claims, 16 Drawing Sheets

(56) References Cited

U.S. PATENT DOCUMENTS

| | | | | |
|---|---|---|---|---|
| 5,594,557 A | * | 1/1997 | Rolleston | H04N 1/6033 358/504 |
| 6,125,199 A | * | 9/2000 | Sato | H04N 1/6055 358/518 |
| 6,292,195 B1 | * | 9/2001 | Shimizu | H04N 1/6058 345/427 |
| 6,323,969 B1 | | 11/2001 | Shimizu et al. | |
| 8,760,714 B1 | * | 6/2014 | Keithley | H04N 1/60 348/231.99 |
| 2001/0053286 A1 | * | 12/2001 | Cannata | H04N 1/00249 396/310 |
| 2002/0080374 A1 | * | 6/2002 | Okamoto | H04N 1/6033 358/1.9 |
| 2003/0081831 A1 | * | 5/2003 | Fukao | H04N 1/6025 382/167 |
| 2005/0280846 A1 | * | 12/2005 | Ichitani | H04N 1/6058 358/1.9 |
| 2006/0279754 A1 | * | 12/2006 | Minakuti | H04N 1/6086 358/1.9 |
| 2007/0035753 A1 | * | 2/2007 | Ichitani | H04N 1/6025 358/1.9 |
| 2009/0231645 A1 | * | 9/2009 | Hayashi | H04N 1/00002 358/520 |
| 2011/0069332 A1 | * | 3/2011 | Katayama | H04N 1/6058 358/1.9 |
| 2011/0069333 A1 | * | 3/2011 | Katayama | H04N 1/6055 358/1.9 |
| 2017/0064096 A1 | * | 3/2017 | Shimura | G06K 15/1822 |

* cited by examiner

FIG. 11

| INPUT RGB VALUE | FOUR POINT GRID | | | | PRIORITY |
| --- | --- | --- | --- | --- | --- |
| | 1 | 2 | 3 | 4 (SUPPORTING POINT) | |
| $R_1G_1B_1$ | 220,240,20 | 240,220,20 | 230,230,30 | 200,200,10 | 1 |
| | | | | | 2 |
| | | | | | 3 |
| | | | | | 4 |
| $R_2G_2B_2$ | 200,250,10 | 250,220,10 | 23,240,40 | 180,220,0 | 1 |
| | ... | ... | ... | ... | ... |
| ... | ... | ... | ... | ... | ... |

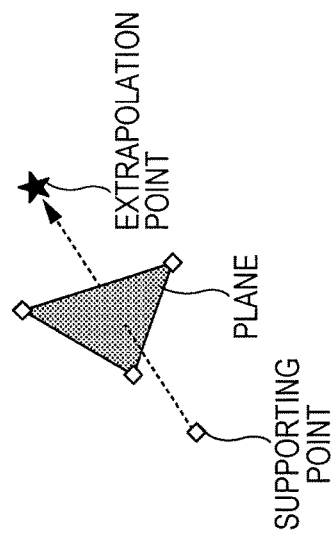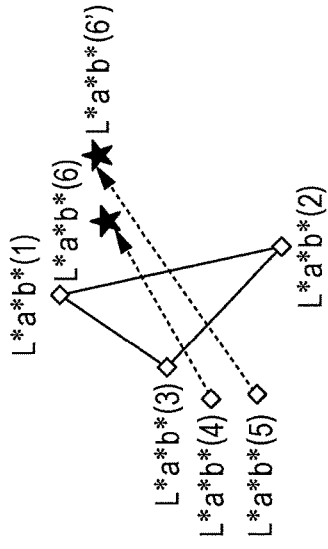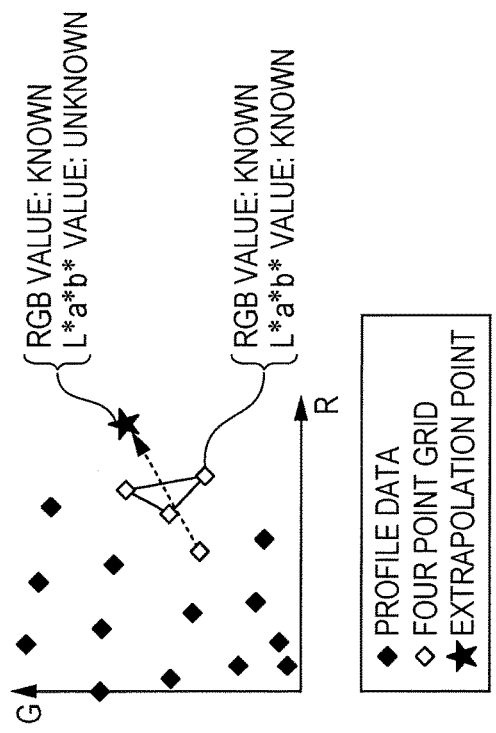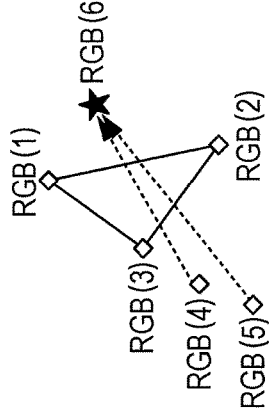

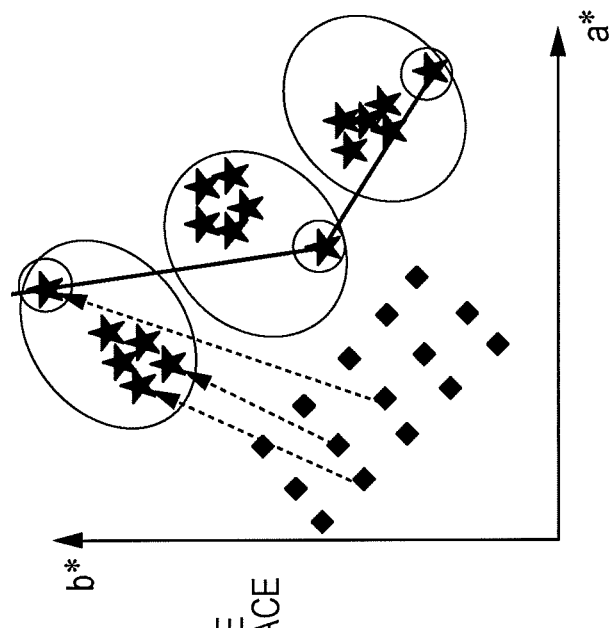
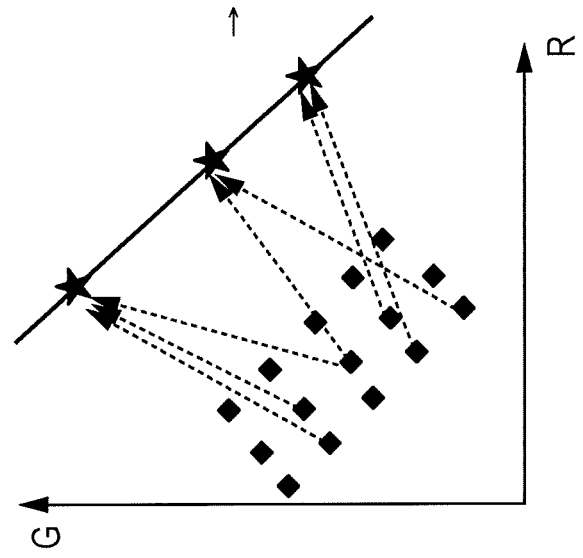
FIG. 18A
FIG. 18B
RGB SPACE → L*a*b* SPACE
◆ PROFILE DATA
★ EXTRAPOLATION POINT

PRINTER, COLOR CONVERSION CONTROL PROGRAM AND COLOR CONVERSION CONTROL METHOD

The entire disclosure of Japanese Patent Application No. 2016-111715 filed on Jun. 3, 2016 including description, claims, drawings, and abstract are incorporated herein by reference in its entirety.

BACKGROUND OF THE INVENTION

Field of the Invention

The present invention relates to a printer, a color conversion control program and a color conversion control method and, in particular, to a printer which performs color conversion by using a scanner profile, a color conversion control program and a color conversion control method which estimate a color after the conversion.

Description of the Related Art

In a device such as a scanner or a printer, since a device value (RGB value or CMYK value) output by the device is a value depending on the device, a color conversion table (device profile) is created to convert this device value into a device independent color, and color conversion is performed by using the device profile. As a method of creating this device profile, for example, to create a scanner profile, a color chart (a color chart in which patches are arranged so that information on the entire color gamut of a printer can be acquired) output by the printer is measured by a scanner and a colorimeter, the RGB values obtained by the measurement with the scanner are associated with colorimetric values such as the L*a*b* values of the CIE 1976 color space, the XYZ values of the CIE 1931 color space or the like obtained by the measurement with the colorimeter, and thereby the scanner profile can be created.

By using the profile thus created, colors defined by the profile (colors on the grids in the color gamut) can be converted into colors of other color spaces. However, colors which are not defined by the profile (colors out of the grids in the color gamut or colors out of the color gamut) cannot be converted into colors of other color spaces. Thus, interpolation calculation is performed on the colors out of the grids in the color gamut by using colors on grids therearound, and extrapolation calculation is performed on the colors out of the color gamut by using colors on a plurality of grids in the vicinity of the boundary of the color gamut. Therefore, color conversion can be performed.

As for this color conversion, for example, JP 11-055536 A discloses a color conversion device which includes a color reproduction unit for performing color reproduction within a predetermined range of a first color space, a color conversion unit for converting a color signal of a second color space into a color signal out of the predetermined range of the first color space and an interpolation unit for interpolating the color signal based on the conversion result into the color signal of the first color space.

In the above interpolation calculation, since the calculation is performed by using the colors on the grids around the input color, the calculation accuracy is high. However, in the extrapolation calculation, since the calculation is performed by extrapolating the colors out of the color gamut from the colors on the grids in the vicinity of the boundary of the color gamut, there is a problem of poor calculation accuracy.

For this problem, a method has been known in which three points on the grids in the vicinity of the boundary of the color gamut are selected, one point on the grid (supporting point) facing the input color (input point), interposing a plane defined by these three points, is selected, extrapolation calculation is performed by using these four points on the grids (referred to as a four point grid), and a converted color (output point) is output. For the extrapolation calculation using this four point grid, a conventional technique has been used in which the supporting point is fixed and three points defining the plane are dynamically selected according to the input point.

In this conventional technique, when the positional relationship between the plane defined by the three points on the grids and the supporting point is changed, a manner in which an error is added in the extrapolation calculation changes. And when color conversion is performed on linearly continuous input points in a color space before the color conversion (e.g., RGB space) by using the four point grid, the output points deviate from the straight line and form an uneven shape in a color space after the color conversion (e.g., L*a*b* space) in some cases. When a printer profile for converting the L*a*b* values into the CMYK values is modified by using these output points with the uneven shape and color conversion is performed by using the modified printer profile to obtain the CMYK values, an undesirable phenomenon such as a tone jump is caused.

SUMMARY OF THE INVENTION

The present invention has been made in light of the above problems, and a main object thereof is to provide a printer, a color conversion control program and a color conversion control method which can minimize unevenness generated by using a four point grid while securing estimation accuracy of color conversion by extrapolation calculation using a scanner profile.

To achieve the abovementioned object, according to an aspect, a printer reflecting one aspect of the present invention comprises: an inline scanner which acquires an RGB value of each patch of a color chart; an inline colorimeter which acquires a colorimetric value of each patch of the color chart; a profile creation unit which creates a profile for associating the RGB value with the colorimetric value of each patch; and a color conversion unit which estimates a colorimetric value corresponding to an RGB value of input data by extrapolation calculation using four points including three points forming a plane and one supporting point in data of the profile, wherein the color conversion unit estimates the colorimetric value corresponding to the RGB value based on a set of four points remained after deleting one or a plurality of sets of four points according to a predetermined rule from a plurality of sets of four points selected for an RGB value input.

To achieve the abovementioned object, according to an aspect, there is provided a non-transitory recording medium storing a computer readable color conversion control program which is operated in a color conversion device or a printer in a printing system including a scanner, a colorimeter, the printer and the color conversion device, and the program reflecting one aspect of the present invention causes the color conversion device or the printer to execute: an RGB value acquisition process which acquires an RGB value of each patch of a color chart from the scanner; a colorimetric value acquisition process which acquires a colorimetric value of each patch of the color chart from the colorimeter; a profile creation process which creates a profile for associating the RGB value with the colorimetric value of each patch; and a color conversion process which estimates a colorimetric value corresponding to an RGB value of input data by extrapolation calculation using four points including three points forming a plane and one supporting point in data of the profile, and in the color conversion process, the colorimetric value corresponding to the RGB value is estimated based on a set of four points remained after deleting one or a plurality of sets of four points according to a predetermined rule from a plurality of sets of four points selected for an RGB value input.

To achieve the abovementioned object, according to an aspect, a color conversion control method in a printing system including a scanner, a colorimeter, a printer and a color conversion device, reflecting one aspect of the present invention is provided, and the color conversion device or the printer executes: an RGB value acquisition process which acquires an RGB value of each patch of a color chart from the scanner; a colorimetric value acquisition process which acquires a colorimetric value of each patch of the color chart from the colorimeter; a profile creation process which creates a profile for associating the RGB value with the colorimetric value of each patch; and a color conversion process which estimates a colorimetric value corresponding to an RGB value of input data by extrapolation calculation using four points including three points forming a plane and one supporting point in data of the profile, and in the color conversion process, the colorimetric value corresponding to the RGB value is estimated based on a set of four points remained after deleting one or a plurality of sets of four points according to a predetermined rule from a plurality of sets of four points selected for an RGB value input.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 11 is one example of a table showing the results of the extrapolation calculation according to the first embodiment of the present invention;

FIGS. 16A and 16B are schematic views for explaining the extrapolation calculation with a four point grid;

FIGS. 17A and 17B are schematic views for explaining changes of estimated values of L*a*b* values when a supporting point of the four points is changed; and FIGS. 18A and 18B are schematic views for explaining problems of the color conversion in the extrapolation calculation.

DESCRIPTION OF THE PREFERRED EMBODIMENTS

Figure 1:
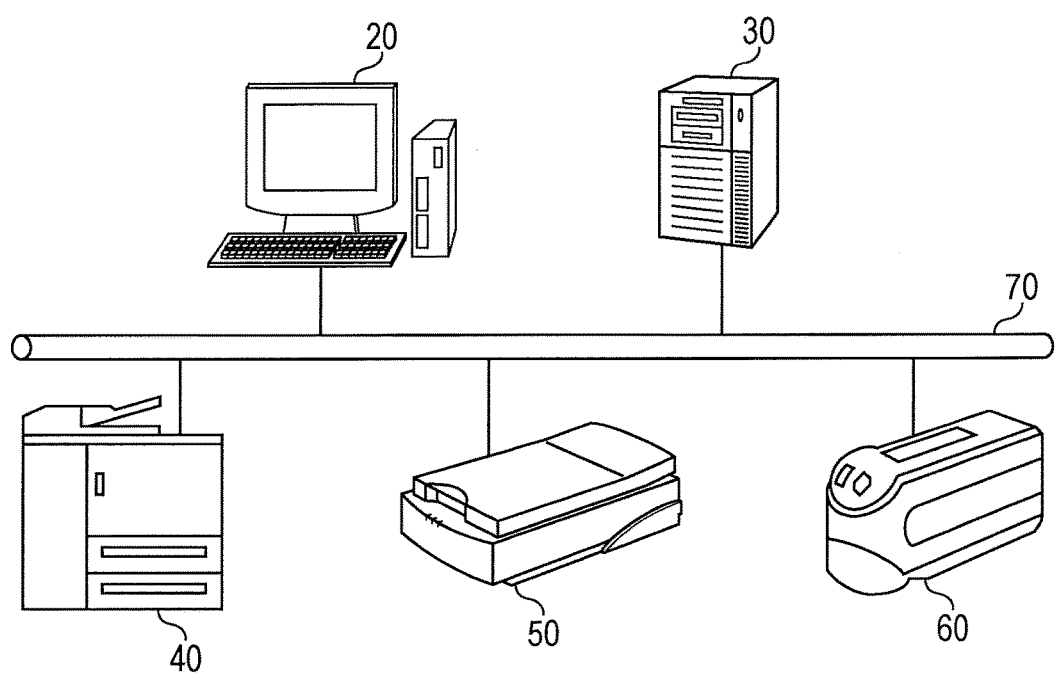
FIG. 1 is a schematic view showing one example of a printing system according to a first embodiment of the present invention.

Hereinafter, an embodiment of the present invention will be described with reference to the drawings. However, the scope of the invention is not limited to the illustrated examples.

As described in the background art, when a device such as a scanner or a printer is used, color conversion is performed by using a color conversion table (device profile) for converting a device value output by the device into a device independent color. In this color conversion table (e.g., a scanner profile), each value of L*, a* and b* at the time of changing each value of R, G and B at regular intervals is written.

Herein, colors defined by the profile (colors on the grids in the color gamut) can be converted into colors of other color spaces. However, colors which are not defined by the profile (colors out of the grids in the color gamut or colors out of the color gamut) cannot be converted into colors of other color spaces. Thus, interpolation calculation is performed on the colors out of the grids in the color gamut by using colors on grids therearound, and extrapolation calculation is performed on the colors out of the color gamut by using colors on a plurality of grids in the vicinity of the boundary of the color gamut. However, there is a problem that the extrapolation calculation has poor calculation accuracy.

For this problem, a method has been known in which three points on the grids in the vicinity of the boundary of the color gamut are selected, one point on the grid (supporting point) facing the input point, interposing a plane defined by these three points, is selected, and extrapolation calculation is performed by using these four points. FIGS. 16A and 16B are views for explaining the extrapolation calculation with a four point grid by using a scanner profile for converting RGB values into L*a*b* values. FIG. 16A is a schematic view showing a relationship between the four points on the grids and an extrapolation point in an RG plane in an RGB space, and FIG. 16B is a schematic view showing a relationship between the four points on the grids and an extrapolation point in an RGB space. In FIGS. 16A and 16B, the black quadrangles are points on the grids defined by the profile, the white quadrangles are the four points selected from the points on the grids, and the black stars are the points obtained by the extrapolation calculation (extrapolation points).

Since the RGB values and the L*a*b* values of the four points on the grids are known and the RGB value of the extrapolation point is known but L*a*b* value of the extrapolation point is unknown, the L*a*b* value of the extrapolation point is estimated by using the L*a*b* values of the four points on the grids based on the relationship between the RGB values of the four points on the grids and the extrapolation point as shown in FIG. 16A. At this time, as shown in FIG. 16B, the four points are selected so that a line connecting the supporting point and the extrapolation point passes through a plane formed by three points in the vicinity of the boundary of the color gamut. However, when the positional relationship between this plane and the supporting point (i.e., the position of the plane through which the line connecting the supporting point and the extrapolation point passes through) is changed, a manner in which an error is added in the extrapolation calculation changes.

FIGS. 17A and 17B are schematic views for explaining changes of the estimated values of the L*a*b* values when the supporting point of the four points changes. FIG. 17A shows a relationship between the four points on the grids and the extrapolation point in the RGB space before the color conversion, and FIG. 17B shows a relationship between the four points on the grids and the extrapolation points in the L*a*b* space after the color conversion. In FIG. 17A, RGB (1) to RGB (3) are RGB values of three points on the grids in the vicinity of the boundary of the color gamut, RGB (4) or RGB (5) is an RGB value of the supporting point, and RGB (6) is an RGB value of the extrapolation point. In FIG. 17B, L*a*b* (1) to L*a*b* (5) are L*a*b* values corresponding to the RGB (1) to RGB (5), respectively, and L*a*b* (6) and L*a*b* (6') are L*a*b* values corresponding to the RGB (6).

In the extrapolation calculation using the four point grid, the L*a*b* value of the extrapolation point is estimated by using the L*a*b* values of the L*a*b* (1) to the L*a*b* (3) and the L*a*b* (4) or the L*a*b* (5) based on the relationships between the RGB (1) to the RGB (3) and the RGB (4) or the RGB (5) and the RGB (6). However, since the RGB space and the L*a*b* space have different physical quantities of the axes, the L*a*b* (6) of when the RGB (4) is selected as the supporting point and the L*a*b* (6') of when the RGB (5) is selected as the supporting point do not have the same value.

As a result, when color conversion is performed with a four point grid on a certain input point in the RGB space, a plurality of output points whose L*a*b* values change according to the supporting points are estimated in the L*a*b* space. FIGS. 18A and 18B are views showing variations of output points in the L*a*b* space when a plurality of supporting points (base points of broken arrows) are selected for each of three linearly continuous input points in the RGB space. When color conversion is performed with a four point grid on linearly continuous input points in the RGB space as shown in FIG. 18A, a plurality of output points (a plurality of output points in the ovals in the drawing) whose L*a*b* values change according to the supporting points are estimated in the L*a*b* space as shown in FIG. 18B. Then, when output points (output points in the circles in the drawing) located at low density positions among the plurality of the output points are estimated, a line connecting these output points has an uneven shape. Thus, when a printer profile for converting the L*a*b* values into the CMYK values is modified by using these output points with the uneven shape and color conversion is performed by using the modified printer profile to obtain the CMYK values, an undesirable phenomenon such as a tone jump is caused.

Therefore, in one embodiment of the present invention, a color chart in which a plurality of patches are arranged is first printed, RGB values and L*a*b* values are acquired by measurements with both a scanner and a colorimeter, and a scanner profile is created to associate the RGB values with the L*a*b* values of each patch of the color chart. Thereafter, extrapolation calculation with a four point grid is performed by using the created scanner profile to create a table. At this time, a plurality of sets of four points with different supporting points are selected for each of a plurality of continuous RGB values, an L*a*b* value is estimated by using each set of the four points to calculate estimated value group, a set of four points corresponding to an L*a*b* value located at a low density position (relatively largely different from others) is excluded from the estimated value group, priorities are set to the remaining sets of the four points, and a table is created to associate the RGB values with the sets of four points and the priorities. Then, when color conversion is performed on the input data, a set of four points corresponding to each RGB value of the input data is selected according to the priorities with reference to the table, and the L*a*b* value is estimated by using the selected sets of the four points.

Alternatively, when color conversion is performed on the input data after a scanner profile is similarly created, a plurality of sets of four points are selected for each RGB value of the input data, an L*a*b* value is estimated by using each set of the four points to calculate the estimated value group, an L*a*b* value located at a low density position (relatively largely different from others) is excluded from the estimated value group, and an L*a*b* value is estimated by using the remaining L*a*b* values.

By thus excluding the L*a*b* value located at a low density position (L*a*b* value obtained with poor calculation accuracy) in the extrapolation calculation using the four point grid, the accuracy of the extrapolation calculation using the four point grid can be enhanced.

Note that a profile means a color conversion table in this specification. Among the profiles, the International Color Consortium (ICC) profile is widely used not only in the printing industry but also in the IT industry and is practically the de facto standard. In the above ICC profile, the input value in the correspondence table is defined as the number of lattices. For example, when the number of lattices is six, a value obtained by dividing 0 to 255 by (the number of lattices −1) is the step size of the input value. Accordingly, each of R, G and B has values of 0, 51, 102, 153, 204 and 255, and input values of the combinations of cube of six and the corresponding colorimetric values are written in the correspondence table.

First Embodiment

Figure 2:
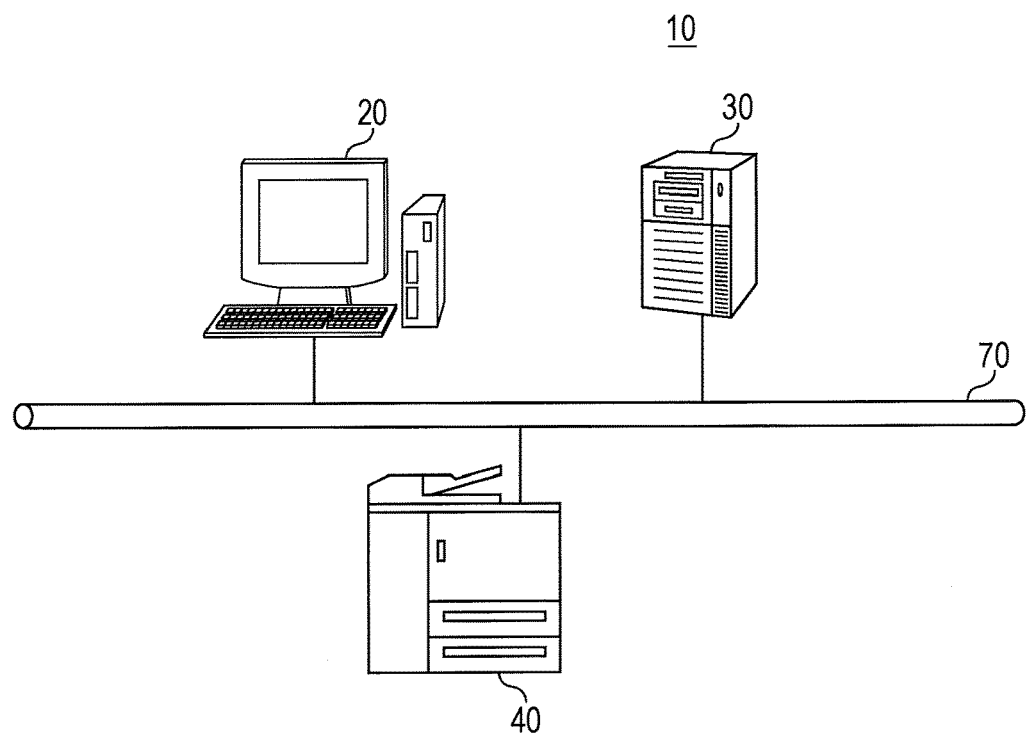
FIG. 2 is a schematic view showing another example of the printing system according to the first embodiment of the present invention.
Figure 3:
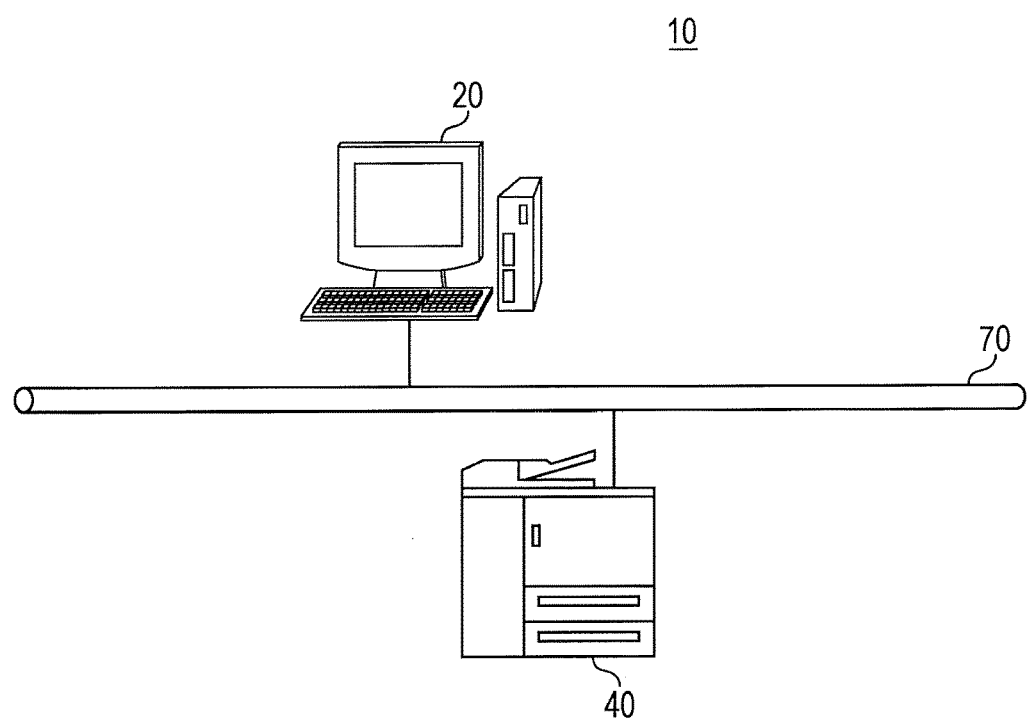
FIG. 3 is a schematic view showing still another example of the printing system according to the first embodiment of the present invention.
Figure 4A:
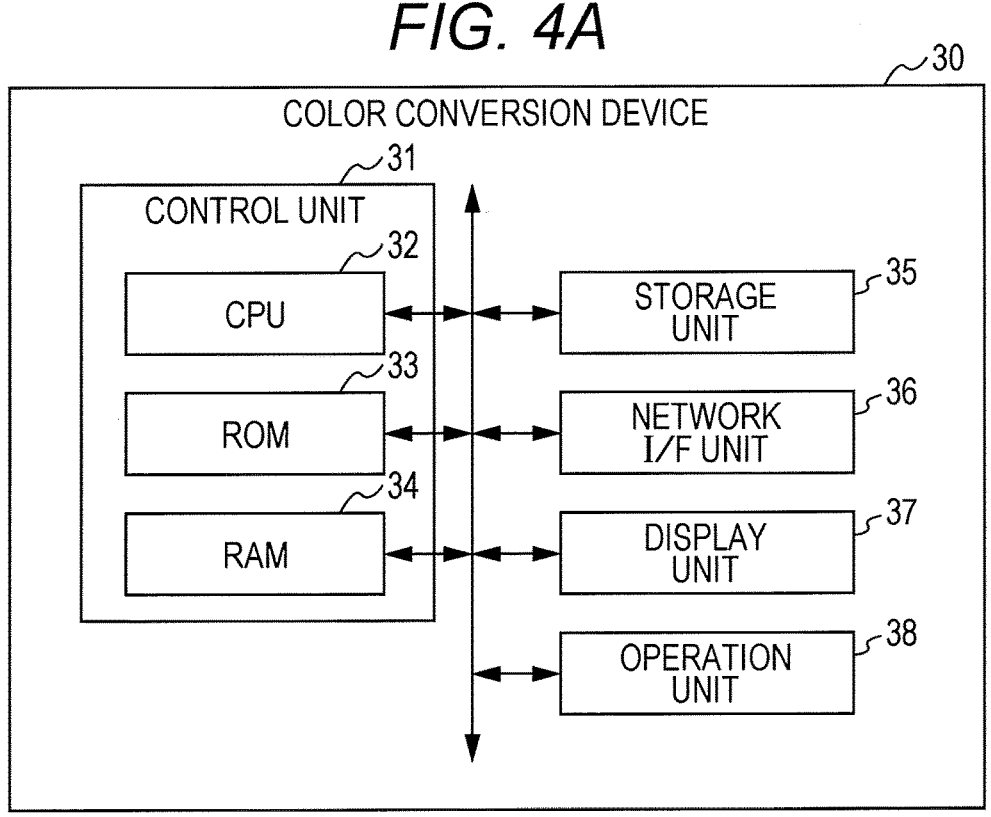
FIGS. 4A and 4B are block diagrams showing a configuration of a color conversion device according to the first embodiment of the present invention.
Figure 4B:
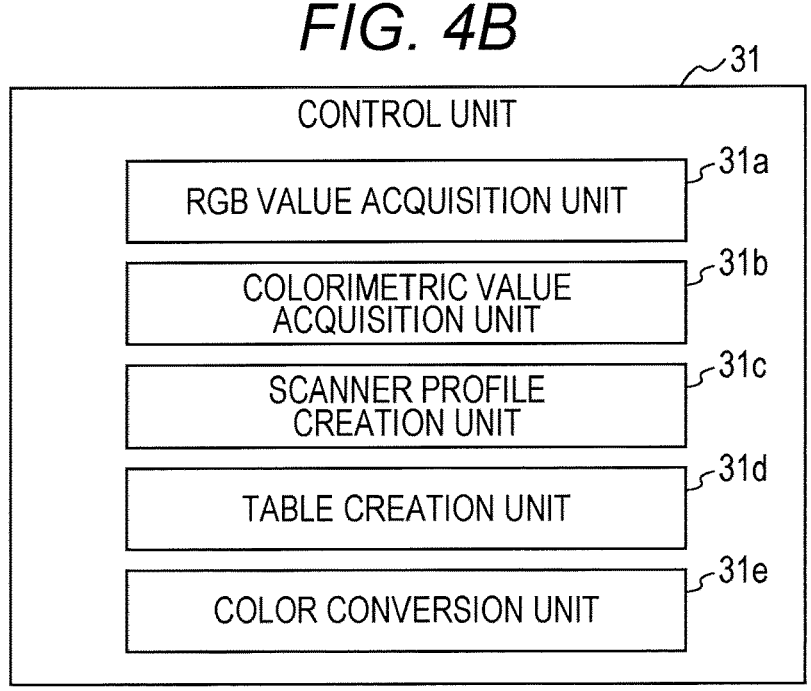
Figure 5:
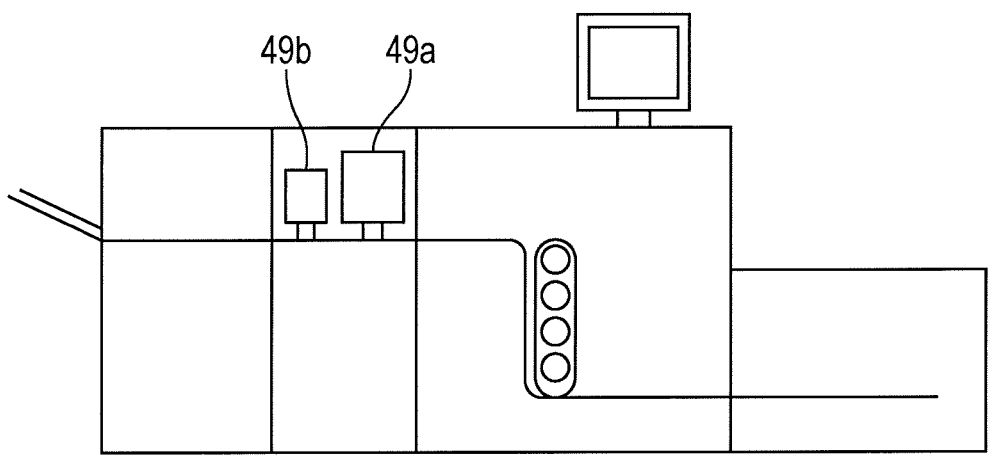
FIG. 5 is a schematic view showing a configuration example of a printer (when including a scanner and a colorimeter) according to the first embodiment of the present invention.
Figure 6A:
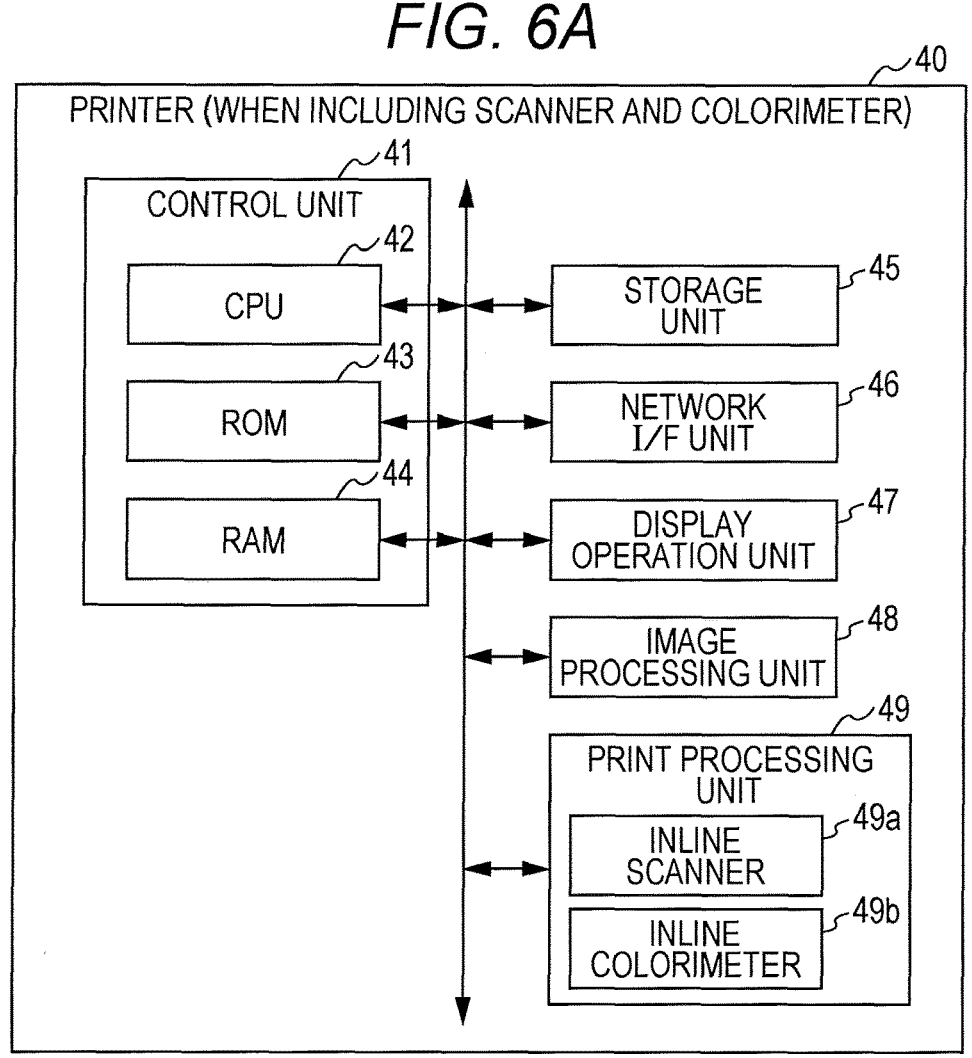
FIGS. 6A and 6B are block diagrams showing a configuration of a printer (when including a color conversion device, a scanner and a colorimeter) according to the first embodiment of the present invention.
Figure 6B:
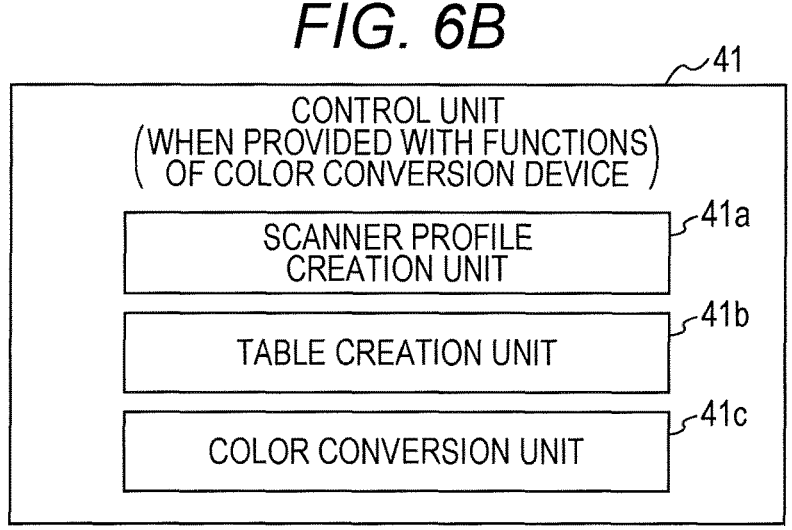
Figure 7:
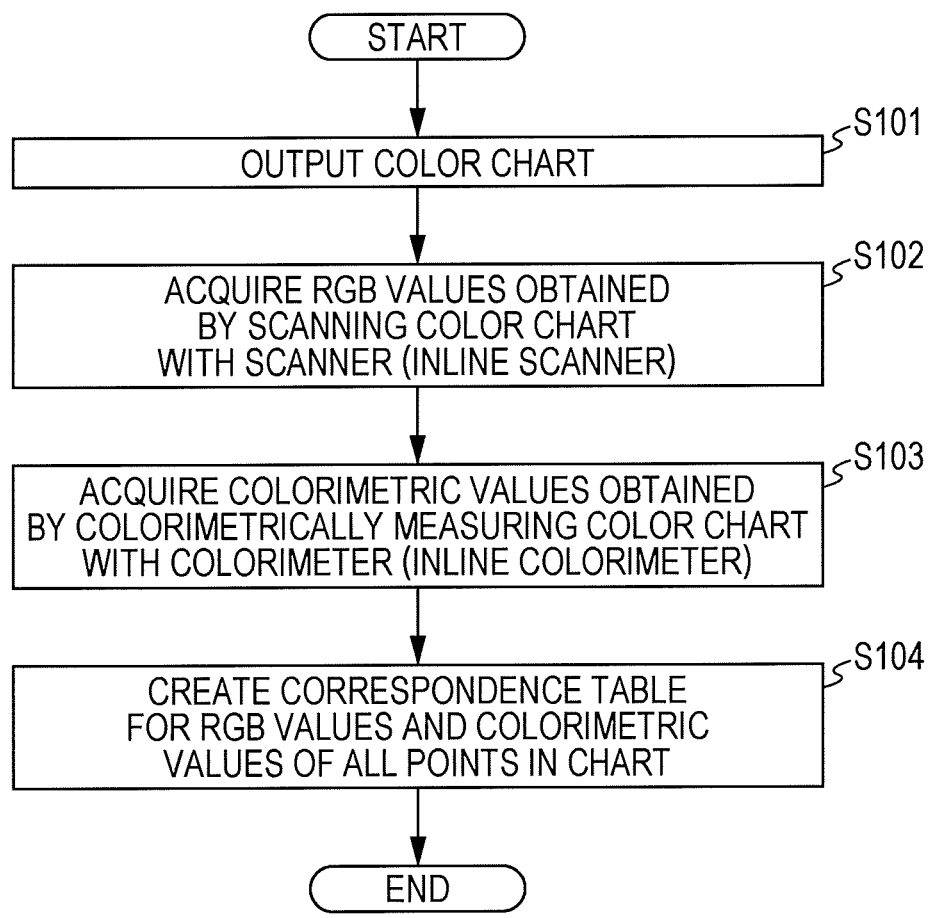
FIG. 7 is a flowchart showing operations (color conversion processes) of the color conversion device according to the first embodiment of the present invention.
Figure 8:
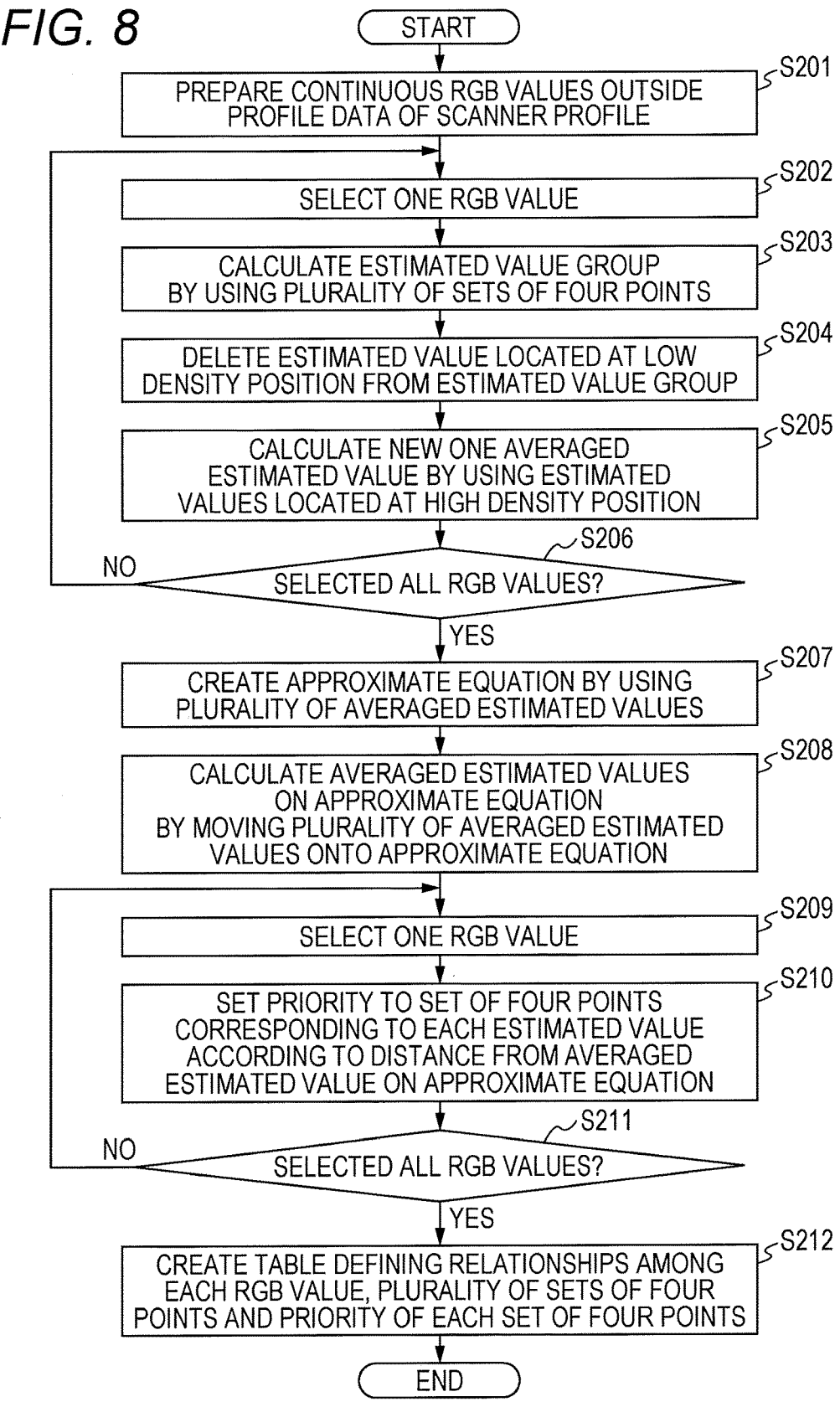
FIG. 8 is a flowchart showing operations (table creation processes) of the color conversion device according to the first embodiment of the present invention.
Figure 9:
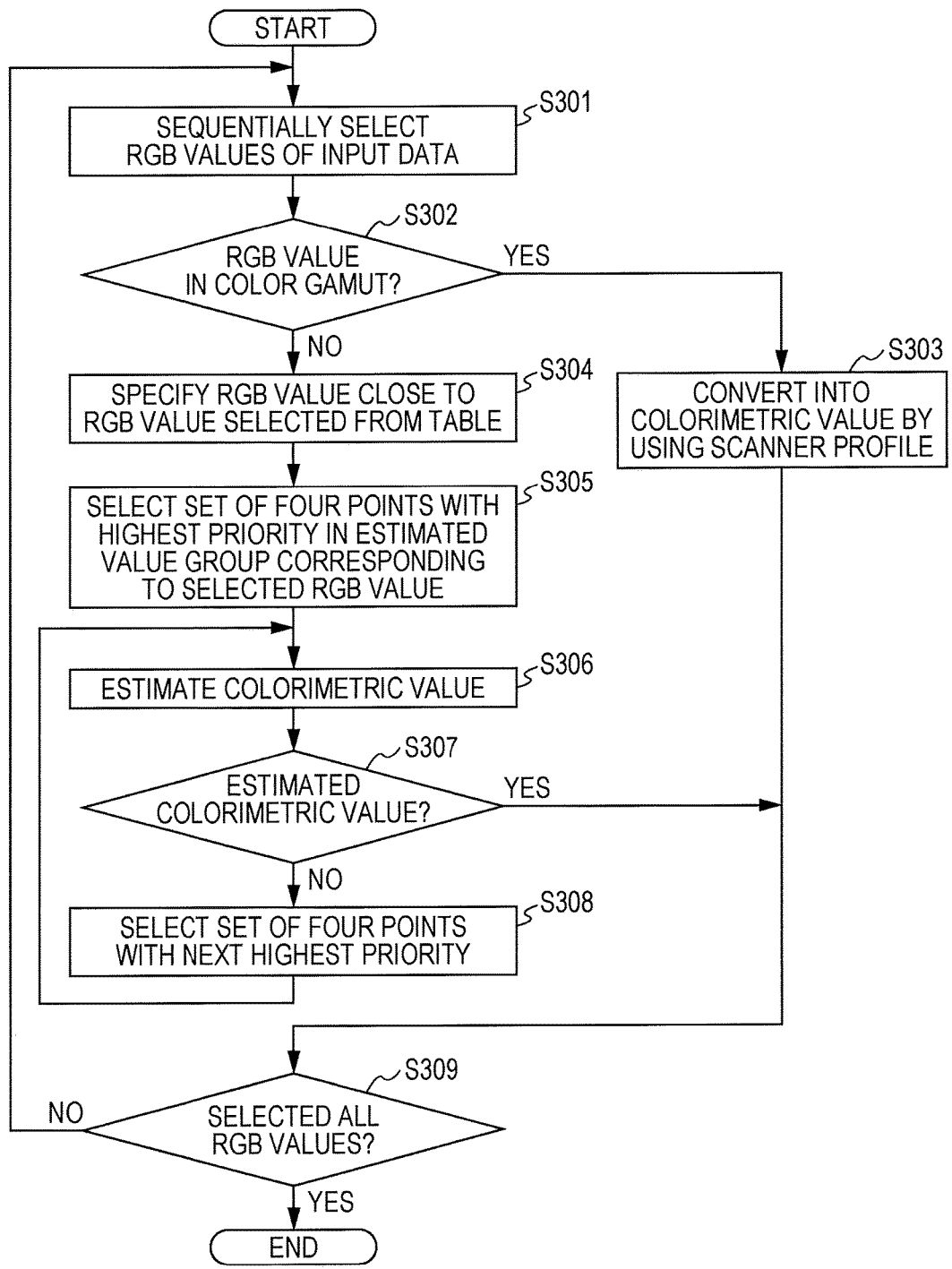
FIG. 9 is a flowchart showing operations (color conversion processes) of the color conversion device according to the first embodiment of the present invention.

To further detail the above one embodiment of the present invention, a printer, a color conversion control program and a color conversion control method according to the first embodiment of the present invention will be described with reference to FIGS. 1 to 11. FIGS. 1 to 3 are schematic views showing configuration examples of a printing system of the present embodiment, and FIGS. 4A and 4B are block diagrams showing a configuration of a color conversion device of the present embodiment. Moreover, FIG. 5 is a schematic view showing a configuration example of a printer (when including a scanner and a colorimeter) of the present embodiment, and FIGS. 6A and 6B are block diagrams showing a configuration of a printer (when including a color conversion device, a scanner and a colorimeter). Furthermore, FIGS. 7 to 9 are flowcharts showing operations of the color conversion device of the present embodiment, FIGS. 10A to 10D are schematic views for explaining extrapolation calculation of the present embodiment, and FIG. 11 is one example of a table showing the results of the extrapolation calculation.

Note that, in the following description, a scanner profile is used as a device profile, colors before conversion by the scanner profile are RGB values, and colors after the conversion are L*a*b* values. Moreover, L*a*b* values estimated by the extrapolation calculation are called estimated values.

As shown in FIG. 1, a printing system 10 of the present embodiment is configured with an output instruction terminal 20, a color conversion device 30, a printer 40, a scanner 50, a colorimeter 60 and the like. These are connected via a communication network 70 such as a local area network (LAN) or a wide area network (WAN) defined by a standard such as Ethernet (registered trademark), Token Ring or Fiber-Distributed Data Interface (FDDI). Note that the color conversion device 30 and the printer 40 may be connected via a dedicated line such as Peripheral Component Interconnect (PCI) connection.

The output instruction terminal 20 is a computer device of a client and issues a job performing printing instruction to the color conversion device 30 by using a printer driver or dedicated software.

The color conversion device 30 creates a scanner profile and a printer profile by using a color chart output from the printer 40. Moreover, the color conversion device 30 performs image processing such as color conversion, screening and rasterization for the job issued by the output instruction terminal 20 and transfers the image data after the image processing to the printer 40. The above color conversion is performed by using a scanner profile and a printer profile created in advance, and extrapolation calculation is controlled so that appropriate color conversion can be performed when a color outside a region defined by profile data (out of the color gamut of the profile) is input. The detailed configuration of this color conversion device 30 will be described later.

The printer 40 receives the image data from the color conversion device 30 and forms an image on a sheet based on the image data to output. The detailed configuration of this printer 40 will also be described later.

The scanner 50 is configured with, for example, three types of sensors, RGB, scans the color chart output from the printer 40 and outputs RGB values.

The colorimeter 60 is a colorimeter of a spectral system (spectrophotometer) capable of measuring each wavelength of light, colorimetrically measures the color chart output from the printer 40 and outputs colorimetric values (L*a*b* values, XYZ values or the like).

Note that FIG. 1 is one example of the printing system of the present embodiment and the configuration thereof can be changed as appropriate. For example, the scanner 50 and the colorimeter 60 may be incorporated in the printer 40 as shown in FIG. 2, or the color conversion device 30 may further be incorporated in the printer 40 as shown in FIG. 3. Hereinafter, the color conversion device 30 and the printer 40 will be detailed.

[Color Conversion Device]

As shown in FIG. 4A, the color conversion device 30 is configured with a control unit 31, a storage unit 35, a network I/F unit 36, a display unit 37, an operation unit 38 and the like.

The control unit 31 is configured with a central processing unit (CPU) 32 and memories such as a read only memory (ROM) 33 and a random access memory (RAM) 34. The CPU 32 develops control programs stored in the ROM 33 and the storage unit 35 into the RAM 34 and executes the programs, thereby controlling the operations of the entire color conversion device 30.

As shown in FIG. 4B, the above control unit 31 also functions as an RGB value acquisition unit 31a, a colorimetric value acquisition unit 31b, a scanner profile creation unit 31c, a table creation unit 31d, a color conversion unit 31e and the like.

To create a scanner profile, the RGB value acquisition unit 31a acquires an RGB value of each patch of a color chart (first color chart) from the scanner 50 (or an inline scanner 49a of the printer 40 described later). Moreover, to use a scanner profile (to perform color conversion by using the scanner profile), the RGB value acquisition unit 31a acquires an RGB value of each patch of a color chart (second color chart) from the scanner 50 (or the inline scanner 49a).

To create a scanner profile, the colorimetric value acquisition unit 31b acquires a colorimetric value (L*a*b* value in the present embodiment) of each patch of a color chart (first color chart) from the colorimeter 60 (or an inline colorimeter 49b of the printer 40 described later).

The scanner profile creation unit 31c creates a scanner profile which associates the RGB values acquired by the RGB value acquisition unit 31a with the colorimetric values (L*a*b* values) acquired by the colorimetric value acquisition unit 31b (converts the RGB values into the colorimetric values (L*a*b* values)) when the scanner profile is created.

The table creation unit 31d selects a plurality of sets of four points (four profile data) for estimating L*a*b* values corresponding to RGB values outside a region defined by the profile data (out of the color gamut of the scanner profile) by extrapolation calculation and sets a priority to each set of the four points. More specifically, the table creation unit 31d selects a plurality of sets of four points for each of continuous RGB values, estimates an L*a*b* value by using each set of the four points to obtain estimated value groups, deletes one or a plurality of estimated values located at a low density position (a difference from other estimated values is relatively large), calculates an averaged estimated value by using estimated values located at a high density position (a difference from other estimated values is relatively small), obtains an approximate equation from the averaged estimated value of each estimated value group, calculates an averaged estimated value on the approximate equation by moving the calculated averaged estimated value to the approximate equation, and sets priorities to the sets of four points based on a distance (difference) between each estimated value and the averaged estimated value on the approximate equation. Then, the table creation unit 31d creates a table which associates the RGB values with a plurality of sets of four points for estimating the L*a*b* values corresponding to the RGB values and the priority set to each set of the four points.

When the RGB values of the input data are on the boundary of the region defined by the profile data or inside the region (in the color gamut of the scanner profile), the color conversion unit 31e converts the RGB values into L*a*b* values by using the scanner profile. When the RGB values of the input data are outside the region defined by the profile data (out of the color gamut of the scanner profile), the color conversion unit 31e estimates the L*a*b* values by extrapolation calculation by using the set of four points selected in descending order of priority with reference to the above table. Then, the color conversion unit 31e converts the converted or estimated L*a*b* values into CMYK values by using the printer profile and outputs the values to the printer 40 (print processing unit 49).

The RGB value acquisition unit 31a, the colorimetric value acquisition unit 31b, the scanner profile creation unit 31c, the table creation unit 31d and the color conversion unit 31e described above may be configured as hardware or a color conversion control program which causes the control unit 31 to function as the RGB value acquisition unit 31a, the colorimetric value acquisition unit 31b, the scanner profile creation unit 31c, the table creation unit 31d and the color conversion unit 31e (causes the color conversion device 30 to execute the RGB value acquisition process, the colorimetric value acquisition process, the scanner profile creation process, the table creation process and the color conversion process), and the CPU 32 may be configured to execute the color conversion control program.

The storage unit 35 is configured with a hard disk drive (HDD), a solid state drive (SSD) and the like and stores a program for the CPU 32 to control each unit, information on a processing function of the device itself, the RGB values acquired by the RGB value acquisition unit 31a, the colorimetric values acquired by the colorimetric value acquisition unit 31b, the scanner profile created by the scanner profile creation unit 31c, the table created by the table creation unit 31d and the like.

The network I/F unit 36 is configured with a network interface card (NIC), a modem and the like and connects the color conversion device 30 to the communication network 70 to enable data communication with the output instruction terminal 20, the printer 40, the scanner 50 and the colorimeter 60.

The display unit 37 is a liquid crystal display (LCD), an organic electro luminescence (EL) display or the like and displays various screens related to the creation of the scanner profile and the extrapolation calculation.

The operation unit 38 is a mouse, a keyboard, a hard switch and the like and enables various operations related to the creation of the scanner profile and the extrapolation calculation.

[Printer]

The printer 40 is an image forming device such as a multi-functional peripheral (MFP) and outputs the first color chart for the creation of the scanner profile and the second color chart for printer calibration, the creation of the printer profile, color inspection and the like. As shown in FIG. 6A, this printer 40 is configured with a control unit 41, a storage unit 45, a network I/F unit 46, a display operation unit 47, an image processing unit 48, a print processing unit 49 and the like.

The control unit 41 is configured with a CPU 42 and memories such as a ROM 43 and a RAM 44, and the CPU 42 develops control programs stored in the ROM 43 and the storage unit 45 into the RAM 44 and executes the control programs, thereby controlling the operations of the entire printer 40. When the printer 40 has the functions of the color conversion device 30, the above control unit 41 also functions as a scanner profile creation unit 41a, a table creation unit 41b, a color conversion unit 41c and the like as shown in FIG. 6B. Note that, since the functions of the scanner profile creation unit 41a, the table creation unit 41b and the color conversion unit 41c are the same as those of the scanner profile creation unit 31c, the table creation unit 31d and the color conversion unit 31e of the color conversion device 30, the descriptions thereof are omitted.

The storage unit 45 is configured with an HDD, an SSD and the like and stores programs for the CPU 42 to control each unit, information on the processing function of the device itself, a printer profile, optionally RGB values acquired by the inline scanner 49a, colorimetric values acquired by the inline colorimeter 49b, a scanner profile created by the scanner profile creation unit 41a, a table created by the table creation unit 41b and the like, which will be described later.

The network I/F unit 46 is configured with an NIC, a modem and the like, connects the printer 40 to the communication network 70 and enables data communication with the color conversion device 30 and the like.

The display operation unit 47 is a touch panel or the like provided with a pressure-sensitive operation unit (touch sensor) in which transparent electrodes are arranged in lattice on the display unit, displays various screens related to printing processes and enables various operations related to printing. Moreover, when the printer 40 has the functions of the color conversion device 30, the display operation unit 47 displays various screens related to the creation of the scanner profile and the extrapolation calculation and enables various operations related to the creation of the scanner profile and the extrapolation calculation.

The image processing unit 48 is provided when the printer 40 has the functions of the color conversion device 30, performs image processing such as rasterization for the job issued by the output instruction terminal 20 and transfers the image data after the image processing to the print processing unit 49. Upon the above image processing, color conversion is performed by utilizing the above color conversion unit 41c.

The print processing unit (print engine) 49 executes print processing based on the image data after the image processing. This print processing unit 49 performs the following processes: irradiates a photosensitive drum charged by a charging device with light corresponding to an image from an exposure device to form an electrostatic latent image; adheres charged toner to develop the image by a developing device; primarily transfers this toner image to a transfer belt; secondarily transfers the image from the transfer belt to a sheet; and further fixes the toner image on the sheet by a fixing device. Moreover, as shown in FIG. 5, when the printer 40 has the functions of the scanner 50 and the colorimeter 60, the print processing unit 49 includes the inline scanner 49a and the inline colorimeter 49b.

The inline scanner 49a is configured with, for example, three types of sensors, RGB, and outputs the RGB values acquired by the RGB sensors. When the printer 40 has the functions of the color conversion device 30, this inline scanner 49a functions as an RGB value acquisition unit.

The inline colorimeter 49b is, for example, a colorimeter of a spectral system (spectrophotometer) capable of measuring each wavelength of light like an external colorimeter and outputs the colorimetric values (L*a*b* values, XYZ values or like) with the same accuracy as the external colorimeter. When the printer 40 has the functions of the color conversion device 30, this inline colorimeter 49b functions as a colorimetric value acquisition unit.

Note that FIGS. 4A and 4B to 6A and 6B are examples of the color conversion device 30 and the printer 40 of the present embodiment, and the configurations thereof can be changed as appropriate.

Hereinafter, the operations of the color conversion device 30 (or the printer 40 having the functions of the color conversion device 30) of the present embodiment will be described. The CPU 32 develops color conversion control programs stored in the ROM 33 or the storage unit 35 into the RAM 34 and executes the programs, thereby executing the process of each step shown in the flowcharts in FIGS. 7 to 9.

[Scanner Profile Creation Process]

First, the procedure for creating a scanner profile will be described with reference to the flowchart in FIG. 7. Note that this process may be performed only once at the very beginning.

The control unit 31 of the color conversion device 30 generates image data of a color chart in which patches are arranged so that information on the entire color gamut of the printer can be acquired, transmits the image data to the printer 40 and causes the printer 40 to output the color chart (S101).

Next, the control unit 31 (RGB acquisition unit 31a) acquires RGB values of all the patches obtained by scanning the above color chart with the scanner 50 (or the inline scanner 49a of the printer 40) (S102).

Subsequently, the control unit 31 (colorimetric value acquisition unit 31b) acquires colorimetric values (L*a*b* values) of all the patches obtained by colorimetrically measuring the above color chart with the colorimeter 60 (or the inline colorimeter 49b of the printer 40) (S103).

Then, the control unit 31 (scanner profile creation unit 31c) creates a color conversion table (scanner profile) which associates the RGB values with the colorimetric values (L*a*b* values) of all the points of the chart, and stores the table in the storage unit 35 and the like (S104).

[Table Creation Process]

Next, with reference to the flowchart in FIG. 8, a procedure for creating a table for setting sets of four points used for the extrapolation calculation by using the scanner profile will be described.

Figure 10A:
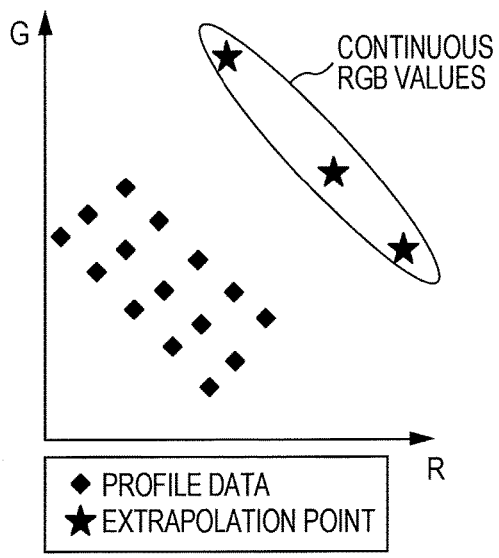
FIGS. 10A to 10D are schematic views for explaining extrapolation calculation according to the first embodiment of the present invention.

First, the control unit 31 (table creation unit 31d) of the color conversion device 30 prepares continuous RGB values outside a region defined by the profile data of the scanner profile (S201). For example, as shown in FIG. 10A, a plurality of linear RGB values in an RGB space (RGB values of the extrapolation points indicated by the stars in the drawing) are prepared.

Figure 10B:
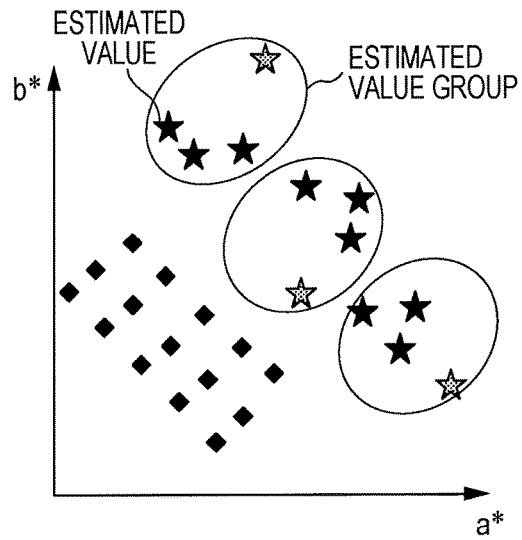

Next, the control unit 31 (table creation unit 31d) selects one RGB value from the prepared RGB values (S202), performs extrapolation calculation on the selected RGB value by using a plurality of sets of four points and calculates estimated value group (S203). FIG. 10B shows the results of the extrapolation calculation using four sets of four points, where one estimated value group is formed by each of four estimated values (estimated L*a*b* values) in the oval.

Subsequently, the control unit 31 (table creation unit 31d) deletes one or a plurality of estimated values located at a low density position (a difference from other estimated values is relatively large) from the calculated estimated value group (S204). In the case of FIG. 10B, the estimated values indicated by hatching dots are estimated values located at the low density positions.

Figure 10C:
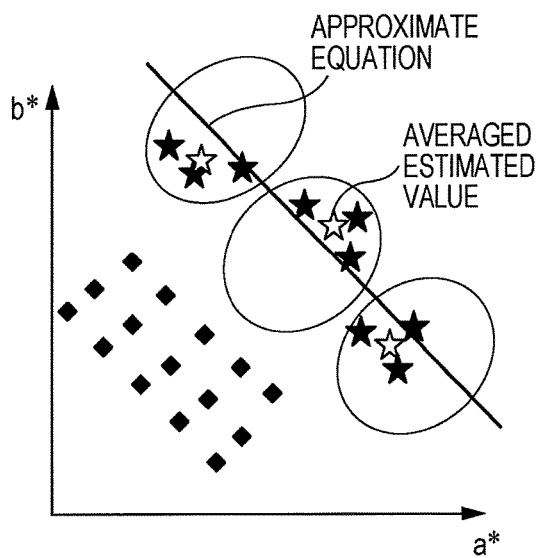

Next, the control unit 31 (table creation unit 31d) calculates one new averaged estimated value by using estimated values located at a high density position (all estimated values after deleting the estimated value located at a low density position) (S205). For example, as shown in FIG. 10C, by calculating the average value of three estimated values (black stars in the drawing) excluding the estimated values indicated by the hatching dots, the averaged estimated values (white stars in the drawing) are calculated.

Then, the control unit 31 (table creation unit 31d) determines whether all the RGB values prepared in S201 have been selected (S206) and returns to S202 to repeat the same processes when the RGB values not selected remain.

Next, the control unit 31 (table creation unit 31d) creates an approximate equation by using a plurality of averaged estimated values (S207). For example, as shown in FIG. 10C, a linear approximate equation is created by applying a least squares method or the like to the plurality of the averaged estimated values.

Figure 10D:
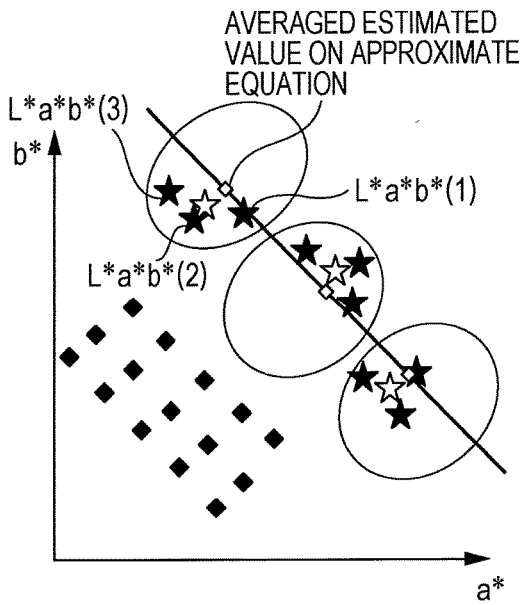

Next, the control unit 31 (table creation unit 31d) calculates averaged estimated values on the approximate equation by moving the plurality of the averaged estimated values onto the approximate equation (S208). For example, as shown in FIG. 10D, the averaged estimated values on the approximate equation indicated by the white circles are calculated by moving the averaged estimated values indicated by the white stars onto the linear approximate equation.

Next, the control unit 31 (table creation unit 31d) selects one RGB value from the RGB values prepared in S201 (S209), calculates a distance (difference) between each estimated value of the estimated value group calculated for the selected RGB value (excluding the estimated value located at a low density position) and the averaged estimated value on the approximate equation and sets priorities to the sets of the four points used for calculating each estimated value according to the calculated distance (S210). For example, as shown in FIG. 10D, the highest priority is set to the set of the four points used for calculating the estimated value (L*a*b* (1)) closest to the averaged estimated value on the approximate equation, the second highest priority is set to the set of the four points used for calculating the estimated value (L*a*b* (2)) second closest to the averaged estimated value on the approximate equation, and the lowest priority is set to the set of the four points used for calculating the estimated value (L*a*b* (3)) farthest from the averaged estimated value on the approximate equation.

Then, the control unit 31 (table creation unit 31d) determines whether all the RGB values prepared in S201 have been selected (S211) and returns to S209 to repeat the same processes when the RGB values not selected remain.

Thereafter, the control unit 31 (table creation unit 31d) creates a table for associating each of the RGB values prepared in S201 with a plurality of sets of four points used for estimating the colorimetric values from the RGB values and the priority of each set of the four points and stores the table in the storage unit 35 and the like (S212). FIG. 11 is one example of the table created by the above procedure.

[Color Conversion Process]

Next, a procedure for executing color conversion by using the table created in the above flow will be described with reference to the flowchart in FIG. 9.

First, the control unit 31 (color conversion unit 31e) of the color conversion device 30 analyzes the job received from the output instruction terminal 20 and sequentially selects the RGB values of the input data specified in the job (S301). Next, the control unit 31 (color conversion unit 31e) determines whether the selected RGB values are in the color gamut of the scanner profile (on the boundary of the region defined by the profile data or inside the region) (S302) and converts the RGB values into the colorimetric values (L*a*b* values) by using the profile data of the scanner profile (S303) when the RGB values are in the color gamut (Yes in S302).

On the other hand, when the selected RGB values are out of the color gamut of the scanner profile (outside the region defined by the profile data) (No in S302), the control unit 31 (color conversion unit 31e) refers to the table saved in the storage unit 35 and the like and specifies the RGB values close to the selected RGB values from the table (S304). Next, the control unit 31 (color conversion unit 31e) selects a set of four points with the highest priority from the sets of the four points corresponding to the specified RGB values (S305) and estimates the colorimetric value (L*a*b* value) by using the selected set of the four points (S306). When the colorimetric value cannot be estimated (No in S307), the control unit 31 (color conversion unit 31e) selects a set of four points with the next highest priority (S308) and returns to S306 to repeat the same processes.

When the colorimetric value can be estimated (Yes in S307) and after the conversion into the colorimetric value in S303, the control unit 31 (color conversion unit 31e) determines whether all the RGB values of the input data have been selected (S309), returns to S301 to select the next RGB values and repeats the same processes when there is an RGB value not selected, and ends the series of the color conversion processes when all the RGB values have been selected.

As described above, the priorities are given to the sets of the four points used for performing extrapolation calculation for the colorimetric values from the RGB values and written in the table. When the input RGB values are outside the region defined by the profile data, the colorimetric values are estimated by selecting a set of four points with higher priority in descending order with reference to the table. Unevenness generated by using a four point grid can be thereby minimized while estimation accuracy of the color conversion by the extrapolation calculation is secured.

Note that, in the above embodiment, although the colorimetric values are estimated with reference to the table created by using the results of the extrapolation calculation when the input RGB values are outside the region defined by the profile data, the scanner profile may be modified by using the results of the extrapolation calculation and the conversion into the colorimetric values may be performed by using the modified scanner profile.

Second Embodiment

Figure 12A:
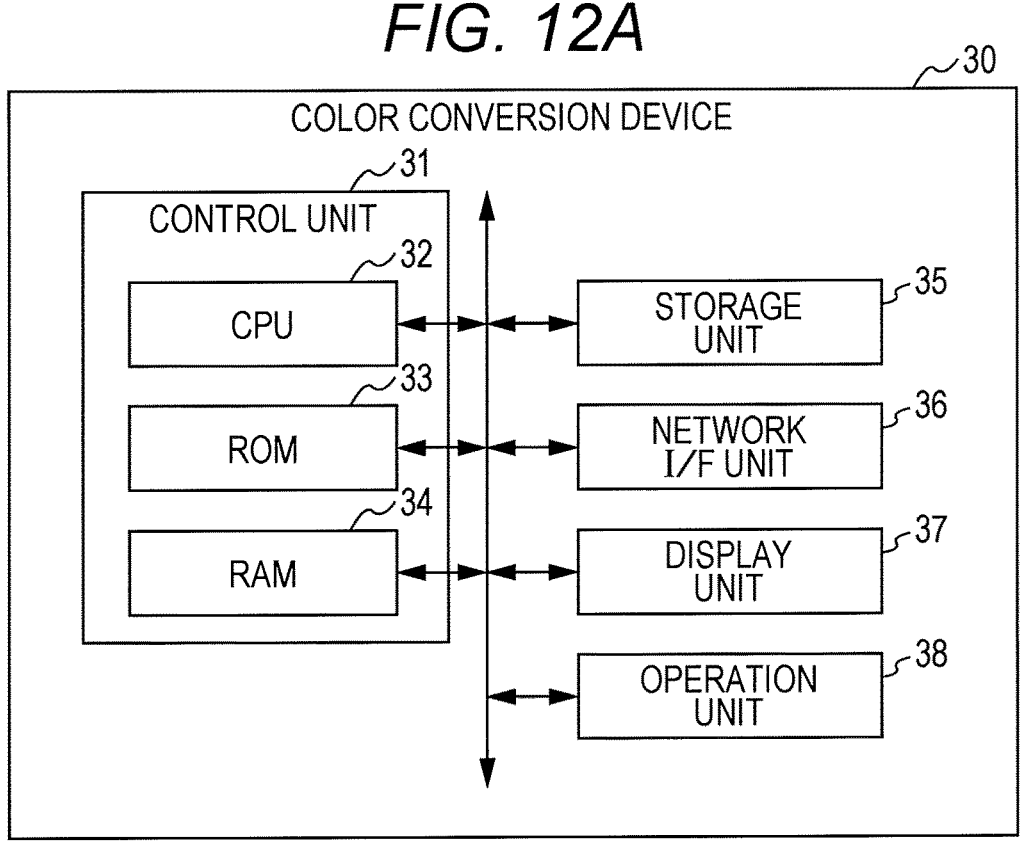
FIGS. 12A and 12B are block diagrams showing a configuration of a color conversion device according to a second embodiment of the present invention.
Figure 12B:
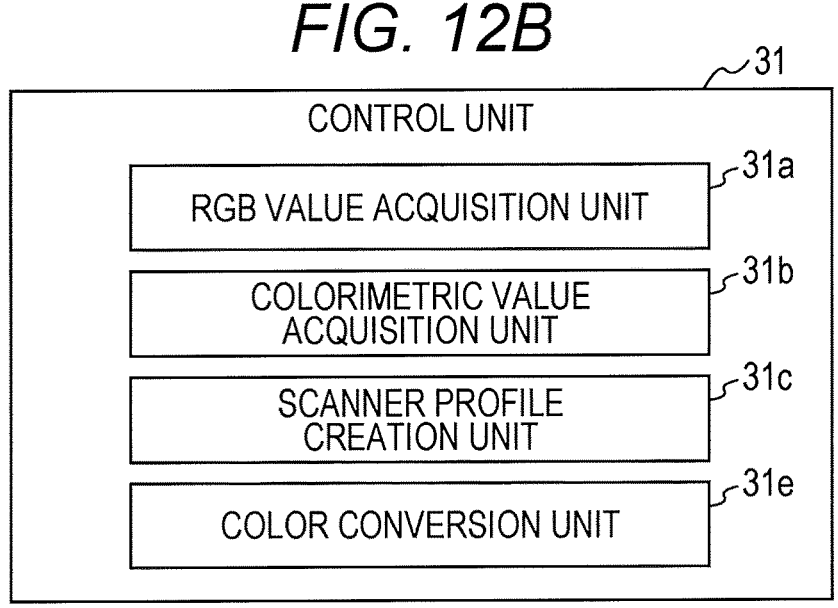
Figure 13A:
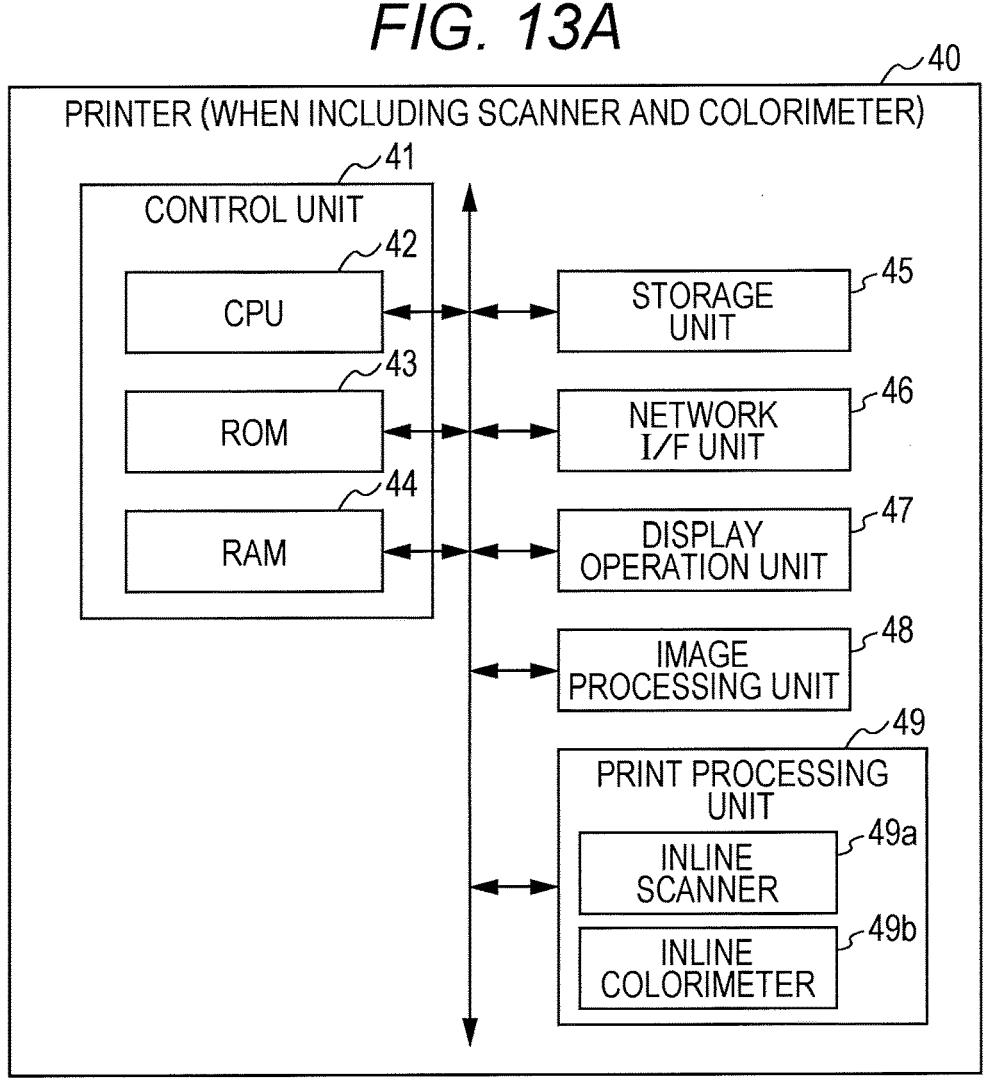
FIGS. 13A and 13B are block diagrams showing a configuration of a printer (when including a color conversion device, a scanner and a colorimeter) according to the second embodiment of the present invention.
Figure 13B:
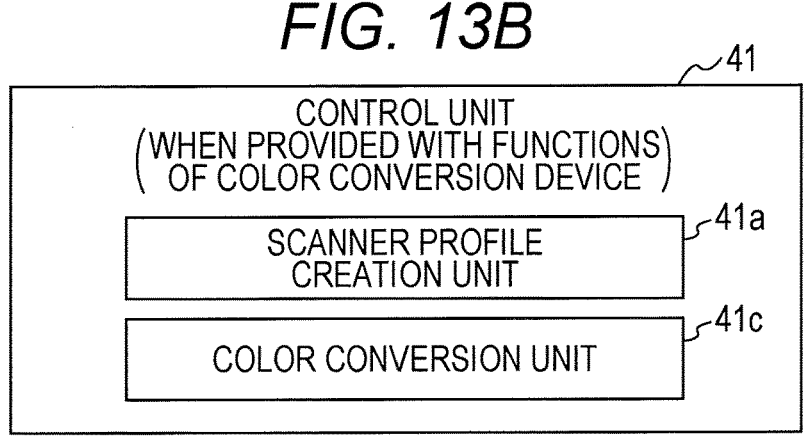
Figure 14:
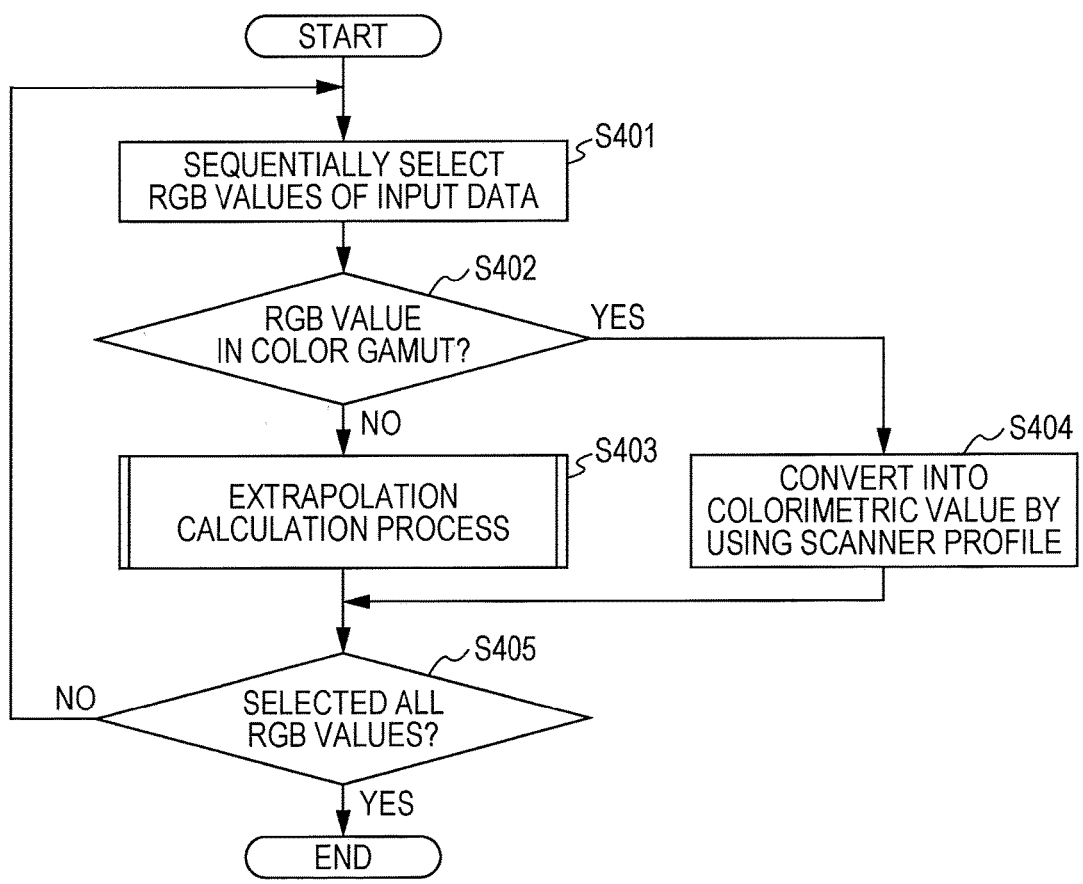
FIG. 14 is a flowchart showing operations (color conversion processes) of the color conversion device according to the second embodiment of the present invention.
Figure 15:
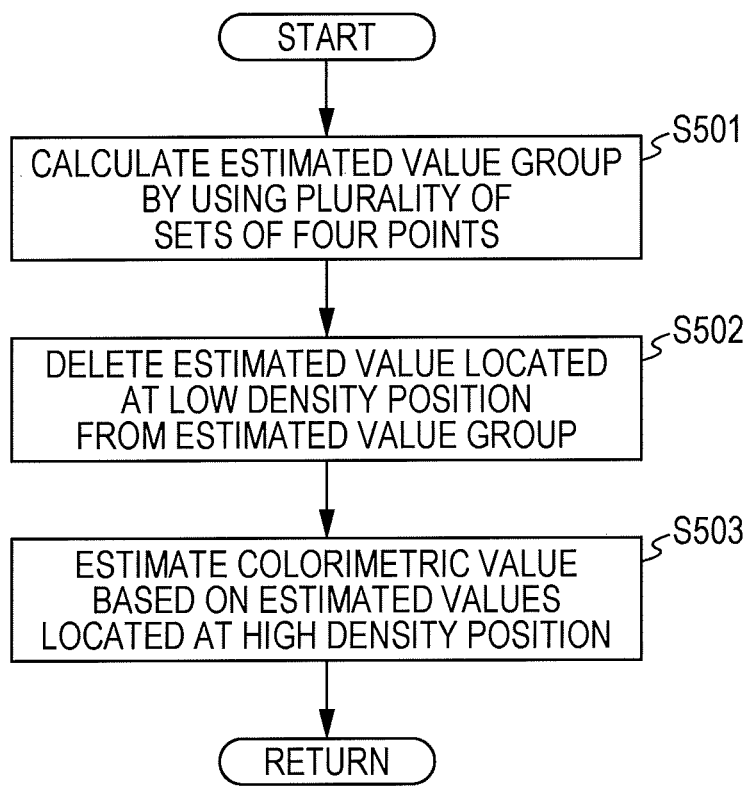
FIG. 15 is a flowchart showing operations (extrapolation calculation processes) of the color conversion device according to the second embodiment of the present invention.

Next, a printer, a color conversion control program and a color conversion control method according to the second embodiment of the present invention will be described with reference to FIGS. 12A and 12B to 15. FIGS. 12A and 12B are block diagrams showing the configuration of a color conversion device of the present embodiment, and FIGS. 13A and 13B are block diagrams showing the configuration of the printer. Moreover, FIGS. 14 and 15 are flowcharts showing the operations of the color conversion device of the present embodiment.

In the aforementioned first embodiment, a table is created in advance by using the scanner profile, and the color conversion is performed by utilizing the table. However, it is not always necessary to create a table, and extrapolation calculation can also be performed upon color conversion.

In this case, the configuration of a printing system 10 is the same as that of the first embodiment shown in FIGS. 1 to 3. However, as shown in FIG. 12B, a control unit 31 of a color conversion device 30 functions as an RGB value acquisition unit 31a, a colorimetric value acquisition unit 31b, a scanner profile creation unit 31c, a color conversion unit 31e and the like. Moreover, when a printer 40 has the functions of the color conversion device 30, a control unit 41 of the printer 40 functions as a scanner profile creation unit 41a, a color conversion unit 41c and the like as shown in FIG. 13B. The operations of the RGB value acquisition unit 31a, the colorimetric value acquisition unit 31b and the scanner profile creation unit 31c (scanner profile creation unit 41a) are the same as those in the first embodiment, but the color conversion unit 31e (color conversion unit 41c) operates as follows.

When the RGB values of the input data are on the boundary of the region defined by the profile data or inside the region (in the color gamut of the scanner profile), the color conversion unit 31e (color conversion unit 41c) converts the RGB values into L*a*b* values by using the scanner profile. When the RGB values of the input data are outside the region defined by the profile data (out of the color gamut of the scanner profile), the color conversion unit 31e (color conversion unit 41c) selects a plurality of sets of four points for the RGB values, estimates L*a*b* values by using each set of the four points to obtain estimated value groups, deletes one or a plurality of estimated values located at a low density position (a difference from other estimated values is relatively large) and estimates the L*a*b* values by using the remaining L*a*b* values (e.g., employs any one of the remaining L*a*b* values as the estimated value). Then, the color conversion unit 31e (color conversion unit 41c) converts the converted or estimated L*a*b* values into CMYK values by using the printer profile and outputs the values to the printer 40 (print processing unit 49).

Hereinafter, the operations (color conversion processes) of the color conversion device 30 (or the printer 40 having the functions of the color conversion device 30) of the present embodiment will be described. The CPU 32 develops color conversion control programs stored in the ROM 33 or the storage unit 35 into the RAM 34 and executes the program, thereby executing the process of each step shown in the flowcharts in FIGS. 14 and 15. Note that, since the scanner profile creation process is the same as that of the first embodiment, the description thereof is omitted.

[Color Conversion Process]

First, the control unit 31 (color conversion unit 31e) of the color conversion device 30 analyzes the job received from the output instruction terminal 20 and sequentially selects the RGB values of the input data specified in the job (S401). Next, the control unit 31 (color conversion unit 31e) determines whether the selected RGB values are on the boundary of the region defined by the profile data or inside the region (in the color gamut of the scanner profile) (S402) and converts the RGB values into the colorimetric values (L*a*b* values) by using the profile data of the scanner profile (S404) when the RGB values are in the color gamut (Yes in S402).

On the other hand, when the selected RGB values are outside the region defined by the profile data (out of the color gamut of the scanner profile) (No in S402), the control unit 31 (color conversion unit 31e) performs extrapolation calculation process (S403). FIG. 15 shows the details of the extrapolation calculation process, and the control unit 31

(color conversion unit 31e) performs the extrapolation calculation on the selected RGB values by using a plurality of sets of four points and calculates estimated value group (S501). Next, the control unit 31 (color conversion unit 31e) deletes one or a plurality of estimated values located at a low density position (a difference from other estimated values is relatively large) from the calculated estimated value group (S502). Then, the control unit 31 (color conversion unit 31e) estimates the colorimetric values based on the estimated values located at a high density position (estimated values remaining after deleting the estimation values located at a low density position) (e.g., selects any one of the estimated values from the estimated values located at a high density position) (S503).

Returning to FIG. 14, the control unit 31 (color conversion unit 31e) determines whether all the RGB values of the input data have been selected (S405), returns to S401 to select the next RGB values and repeats the same processes when there is an RGB value not selected, and ends the series of the color conversion processes when all the RGB values have been selected.

As described above, when the input RGB values are outside the region defined by the profile data (out of the color gamut of the scanner profile), the colorimetric values are estimated by using the estimated values other than the estimated values located at a low density position (a difference from other estimated values is relatively large) (e.g., one of the estimated values is employed as the colorimetric value). Unevenness generated by using a four point grid can be thereby minimized while estimation accuracy of the color conversion by the extrapolation calculation is secured.

Note that the present invention is not limited to the above embodiments and the configurations and controls of the system and each device can be changed as appropriate without departing from the gist of the present invention.

For example, the inline colorimeter 49b may be an external colorimeter, and the inline scanner 49a may be a flatbed scanner. However, in order to enable creation/utilization of the scanner profile on the spot, the inline forms are preferred.

Moreover, the printer 40 may be a CMYK printer or an RGB printer, can be an electrophotographic printer, an inkjet printer, an offset printing machine or the like and is not particularly limited.

Moreover, in the above embodiments, the L*a*b* values of the CIE 1976 color space are exemplified as the colorimetric values. However, the colorimetric values may be XYZ values of the CIE 1931 color space or a color appearance model such as CIECAM 02 and are not particularly limited.

Furthermore, in the above embodiments, the color conversion device 30 creates the scanner profile and performs the extrapolation calculation by using the scanner profile. However, the color conversion control method of the present invention can also be applied similarly when the printer 40 creates the scanner profile and performs the extrapolation calculation by using the scanner profile.

The present invention can be applied to a printer which performs color conversion by using a scanner profile, a color conversion control program which estimates a color after the conversion, a recording medium which records the color conversion control program, and a color conversion control method.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A printer comprising:
a scanner which acquires an RGB value of each patch of a color chart;
a colorimeter which acquires a colorimetric value of each patch of the color chart;
a profile creation unit which creates a profile for associating the RGB value of each patch with the colorimetric value of each patch; and
a color conversion unit which includes a hardware processor configured to:
estimate a colorimetric value corresponding to an RGB value of input data by extrapolation calculation using at least four points including three points forming a plane and one supporting point in data of the profile, wherein
estimating the colorimetric value corresponding to the RGB value of the input data is further based on a set of four points remaining after deleting one or a plurality of sets of the points according to a predetermined rule.

2. A printer comprising:
an inline scanner which acquires an RGB value of each patch of a color chart;
an inline colorimeter which acquires a colorimetric value of each patch of the color chart;
a profile creation unit which creates a profile for associating the RGB value with the colorimetric value of each patch;
a color conversion unit which estimates a colorimetric value corresponding to an RGB value of input data by extrapolation calculation using four points including three points forming a plane and one supporting point in data of the profile, wherein the color conversion unit estimates the colorimetric value corresponding to the RGB value based on a set of four points remained after deleting one or a plurality of sets of four points according to a predetermined rule from a plurality of sets of four points selected for an RGB value input, and
a table creation unit which creates a table for associating the RGB value with the plurality of the sets of the four points and a priority set to each of the sets of the four points,
wherein the color conversion unit selects a set of four points with a relatively higher priority with reference to the table and estimates the colorimetric value based on the set of the four points selected.

3. The printer according to claim 2, wherein
the table creation unit calculates an estimated value group including a plurality of estimated values estimated by using a plurality of sets of four points for each of a plurality of RGB values which are continuous, deletes an estimated value with a relatively large difference from other estimated values from the estimated value group, calculates averaged estimated values by using estimated values remained, calculates an approximate equation by using the averaged estimated values of the plurality of the RGB values, calculates an averaged estimated value on the approximate equation by moving the averaged estimated value onto the approximate equation, and sets the priority to each of the sets of the four points according to a difference between each of the estimated values and the averaged estimated value on the approximate equation.

4. The printer according to claim 1, wherein
the color conversion unit calculates an estimated group of values including a plurality of estimated values estimated by using a plurality of sets of four points for each of RGB values of the input data, deletes an estimated value with a relatively large difference from other estimated values from the estimated value group, and estimates the colorimetric value based on estimated values remained.

5. The printer according to claim 1, wherein
the color conversion unit converts the RGB value into the colorimetric value by using the profile when the RGB value of the input data is on a boundary of a region defined by the data of the profile or inside the region, and estimates the colorimetric value by the extrapolation calculation by using the set of the four points when the RGB value of the input data is outside the region.

6. The printer according to claim 1, wherein
the profile is a scanner profile, and
the colorimetric value is an L*a*b* value of CIE 1976 color space or an XYZ value of CIE 1931 color space.

7. The printer according to claim 1, wherein the scanner is an inline scanner, and the colorimeter is an inline colorimeter.

8. The printer according to claim 1, wherein
the color conversion unit estimates the colorimetric value by deleting the set of points with a relatively large difference from other sets of points.

9. A non-transitory recording medium storing a computer readable color conversion control program which is operated in a color conversion device or a printer in a printing system including a scanner, a colorimeter, the printer and the color conversion device, wherein
the program causes the color conversion device or the printer to execute:
an RGB value acquisition process which acquires an RGB value of each patch of a color chart from the scanner;
a colorimetric value acquisition process which acquires a colorimetric value of each patch of the color chart from the colorimeter;
a profile creation process which creates a profile for associating the RGB value with the colorimetric value of each patch; and
a color conversion process which estimates a colorimetric value corresponding to an RGB value of input data by extrapolation calculation using at least four points including three points forming a plane and one supporting point in data of the profile, and
in the color conversion process, the colorimetric value corresponding to the RGB value of the input data is estimated based on a set of four points remaining after deleting one or a plurality of sets of the points according to a predetermined rule.

10. The non-transitory recording medium storing a computer readable color conversion control program according to claim 9, wherein
the program further causes the color conversion device or the printer to execute a table creation process which creates a table for associating the RGB value with the plurality of the sets of the four points and a priority set to each of the sets of the four points, and
in the color conversion process, a set of four points with a relatively higher priority is selected with reference to the table, and the colorimetric value is estimated based on the set of the four points selected.

11. The non-transitory recording medium storing a computer readable color conversion control program according to claim 10, wherein
in the table creation process, an estimated value group including a plurality of estimated values estimated by using a plurality of sets of four points is calculated for each of a plurality of RGB values which are continuous, an estimated value with a relatively large difference from other estimated values is deleted from the estimated value group, averaged estimated values are calculated by using estimated values remained, an approximate equation is calculated by using the averaged estimated values of the plurality of the RGB values, an averaged estimated value on the approximate equation is calculated by moving the averaged estimated value onto the approximate equation, and the priority is set to each of the sets of the four points according to a difference between each of the estimated values and the averaged estimated value on the approximate equation.

12. The non-transitory recording medium storing a computer readable color conversion control program according to claim 9, wherein
in the color conversion process, an estimated value group including a plurality of estimated values estimated by using a plurality of sets of four points is calculated for each of RGB values of the input data, an estimated value with a relatively large difference from other estimated values is deleted from the estimated value group, and the colorimetric value is estimated based on estimated values remained.

13. The non-transitory recording medium storing a computer readable color conversion control program according to claim 9, wherein
in the color conversion process, the RGB value is converted into the colorimetric value by using the profile when the RGB value of the input data is on a boundary of a region defined by the data of the profile or inside the region, and the colorimetric value is estimated by the extrapolation calculation by using the set of the four points when the RGB value of the input data is outside the region.

14. The non-transitory recording medium storing a computer readable color conversion control program according to claim 9, wherein
the profile is a scanner profile, and
the colorimetric value is an L*a*b* value of CIE 1976 color space or an XYZ value of CIE 1931 color space.

15. The non-transitory recording medium storing a computer readable color conversion control program according to claim 9, wherein
the scanner is an inline scanner incorporated in the printer, and
the colorimeter is an inline colorimeter incorporated in the printer.

16. A color conversion control method in a printing system including a scanner, a colorimeter, a printer and a color conversion device, wherein
the color conversion device or the printer executes:
an RGB value acquisition process which acquires an RGB value of each patch of a color chart from the scanner;
a colorimetric value acquisition process which acquires a colorimetric value of each patch of the color chart from the colorimeter;
a profile creation process which creates a profile for associating the RGB value of each patch with the colorimetric value of each patch; and
a color conversion process which estimates a colorimetric value corresponding to an RGB value of input data by extrapolation calculation using at least four points including three points forming a plane and one supporting point in data of the profile, and in the color conversion process, the colorimetric value corresponding to the RGB value of the input data is estimated based on a set of four points remaining after deleting one or a plurality of sets of the points according to a predetermined rule.

17. The color conversion control method according to claim 16, wherein the color conversion device or the printer further executes a table creation process which creates a table for associating the RGB value with the plurality of the sets of the four points and a priority set to each of the sets of the four points, and in the color conversion process, a set of four points with a relatively higher priority is selected with reference to the table, and the colorimetric value is estimated based on the set of the four points selected.

18. The color conversion control method according to claim 17, wherein in the table creation process, an estimated value group including a plurality of estimated values estimated by using a plurality of sets of four points is calculated for each of a plurality of RGB values which are continuous, an estimated value with a relatively large difference from other estimated values is deleted from the estimated value group, averaged estimated values are calculated by using estimated values remained, an approximate equation is calculated by using the averaged estimated values of the plurality of the RGB values, an averaged estimated value on the approximate equation is calculated by moving the averaged estimated value onto the approximate equation, and the priority is set to each of the sets of the four points according to a difference between each of the estimated values and the averaged estimated value on the approximate equation.

19. The color conversion control method according to claim 16, wherein in the color conversion process, an estimated value group including a plurality of estimated values estimated by using a plurality of sets of four points is calculated for each of RGB values of the input data, an estimated value with a relatively large difference from other estimated values is deleted from the estimated value group, and the colorimetric value is estimated based on estimated values remained.

20. The color conversion control method according to claim 16, wherein in the color conversion process, the RGB value is converted into the colorimetric value by using the profile when the RGB value of the input data is on a boundary of a region defined by the data of the profile or inside the region, and the colorimetric value is estimated by the extrapolation calculation by using the set of the four points when the RGB value of the input data is outside the region.

21. The color conversion control method according to claim 16, wherein the profile is a scanner profile, and the colorimetric value is an L*a*b* value of CIE 1976 color space or an XYZ value of CIE 1931 color space.

22. The color conversion control method according to claim 16, wherein the scanner is an inline scanner incorporated in the printer, and the colorimeter is an inline colorimeter incorporated in the printer.

* * * * *